United States Patent

[11] 3,593,409

| [72] | Inventor | Joseph J. Silverstein<br>Woodmere, N.Y. |
|---|---|---|
| [21] | Appl. No. | 832,071 |
| [22] | Filed | June 11, 1969 |
| [45] | Patented | July 20, 1971 |
| [73] | Assignee | The Ore-Lube Corporation<br>College Point, N.Y. |

[54] METHOD FOR INHIBITING SPREAD OF HEAT UTILIZING BENTONITE
10 Claims, 4 Drawing Figs.

[52] U.S. Cl............................................. 29/488,
117/6, 148/13.1, 148/20.6, 148/27, 148/28, 252/62
[51] Int. Cl..................................................... B23k 1/20, B23k 31/02
[50] Field of Search............................................ 29/487, 488, 494; 117/6, 138; 148/13.1, 13.2, 18, 20.6, 27, 28; 106/DIG. 4; 252/62, 310

[56] References Cited
UNITED STATES PATENTS

| 587,861 | 8/1897 | Reuter......................... | 148/13.2 |
|---|---|---|---|
| 1,572,921 | 2/1926 | Gizienski...................... | 29/488 |
| 2,046,747 | 7/1936 | Howlett et al. ............... | 36/72 |
| 2,396,979 | 3/1946 | Baldwin........................ | 117/6 |
| 2,641,674 | 6/1953 | Orr et al. ..................... | 29/488 X |
| 2,898,253 | 8/1959 | Schneider et al. ............ | 148/20.6 |
| 3,037,878 | 6/1962 | Cowles et al.................. | 148/13.1 X |
| 3,180,765 | 4/1965 | Townsend et al............. | 148/13.1 |
| 3,430,686 | 3/1969 | Parkison et al. .............. | 29/488 X |

*Primary Examiner*—John F. Campbell
*Assistant Examiner*—Ronald J. Shore
*Attorney*—Arthur T. Groeninger ABSTRACT: A process for preventing the spread of heat to areas adjacent a portion of a member being subjected to heat, as by gas torch, electric arc or the like. The process includes the application of a paste comprising a water swollen bentonite clay to areas adjacent the zone to be heated, and/or the application of a paste as a temporary protective covering for adjacent objects to be protected from radiation or direct flame contact. The water swollen bentonite acts as a water curtain to absorb the heat. When it is applied adjacent the heated zone of a member, it prevents conduction of heat to other portions of the member which might otherwise be subject to distortion and/or other damage. When applied as a temporary protective covering to adjacent objects, it prevents the covered objects from reaching ignition temperature or otherwise being damaged due to flames or radiation impinging thereagainst.

PATENTED JUL 20 1971 3,593,409
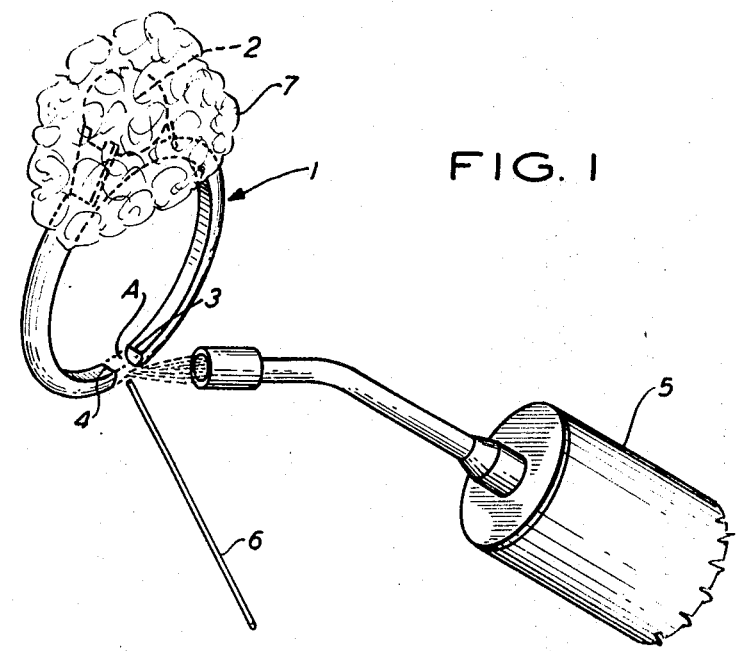
FIG. 1
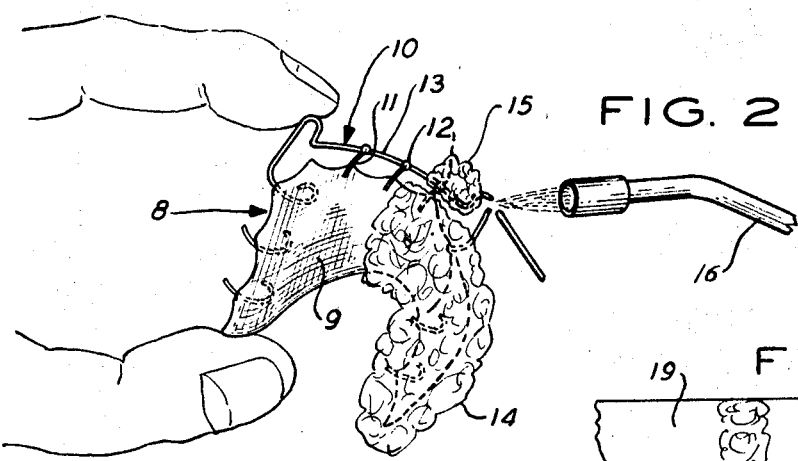
FIG. 2
FIG. 4
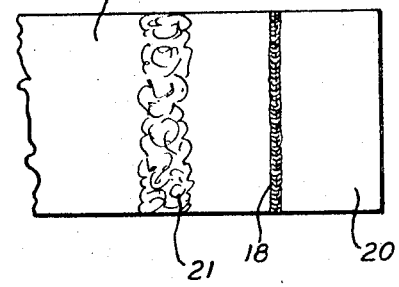
FIG. 3
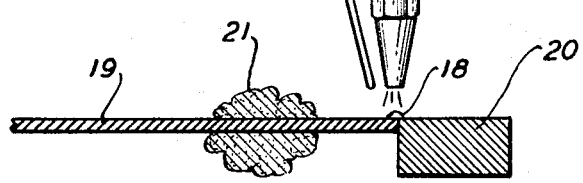
INVENTOR
JOSEPH J. SILVERSTEIN
BY
ATTORNEY

METHOD FOR INHIBITING SPREAD OF HEAT UTILIZING BENTONITE

BACKGROUND OF THE INVENTION

In soldering, welding, brazing and other heat treating processes involving intense application of heat to a member, a common problem is uncontrolled spread of heat to other portions of the member and/or to adjacent objects through radiation or flame impingement. This spread of heat often results in warping, cracking, melting, charring, ignition, discoloration or temper variation of such other portions and adjacent objects.

In the past, it has been proposed to apply a stream of carbon dioxide to the area adjacent the heat applied area as described, e.g., in U.S. Pat. No. 2,862,294. The elaborate equipment involved has minimized use of this equipment. In addition, the value of this system for protecting against radiation or direct flame impingement is minimal.

An alternative technique is described in U.S. Pat. No. 2,930,117 wherein a viscous oil is applied to an area adjacent a surface to be brazed so as to protect an adjacent plastic coated area from melting. Oil is not cohesive and therefore it can not be readily applied to many surfaces in need of protection. The flashpoint of oils further limits the use of this system. Still further, special solvents are usually required to remove the oil.

BRIEF SUMMARY OF THE INVENTION

Prior to welding, soldering or the like, the surface adjacent the area to receive the applied heat is spread or coated with water swollen bentonite clay. In addition, adjacent objects subject to damage as a result of radiation or direct flame impingement are provided with a temporary protective coating of the clay. The clay may be applied by hand, or coated by any conventional technique, such as by brush, spray, etc.

Heat applied to a member during welding, or soldering operations will be conducted by the member to the adjacent bentonite and absorbed by the water in the bentonite thereby inhibiting further heat conduction along the member. In addition, heat radiated to adjacent objects protectively covered by the bentonite will be free from damage as the bentonite forms a continuous, refractory outer crust upon flame impingement thereby insulating the object from the applied heat. In addition, the crust so formed, is backed by a curtain of water, which must be driven off before any possibility exists of damaging heat being transferred to the object.

DRAWINGS

FIG. 1 shows a ring being soldered in accordance with the present invention.

FIG. 2 shows an orthodontic retainer being soldered in accordance with the present invention.

FIG. 3 shows two pieces of metal being welded in accordance with the present invention.

FIG. 4 is a plan view of the metals in FIG. 3.

DETAILED DESCRIPTION

In the drawing, typical applications of the present invention are shown. It is to be understood that the present invention has application to any process wherein heat is generated by a gas torch or the like to the detriment of surrounding objects or surfaces as a result of heat conduction, convection, radiation or direct flame contact.

Referring to FIG. 1, a ring 1 is shown having a stone 2 mounted thereon. The ring 1 has had a portion removed as indicated by a gap A for the purpose of reducing the size of the ring.

In soldering together ends 3 and 4 of ring 1 so as to close gap A, the solderer is often required to remove stone 2 so as to avoid possible damage thereto due to heat conducted through the ring 1 and heat applied by way of direct flame impingement, convection or radiation during the soldering operation.

In accordance with the present invention, prior to applying heat by gas torch 5 so as to condition the ring for receiving solder 6, water swollen bentonite clay 7 is applied so as to cover stone 2 and ring portions adjacent thereto. The clay on the ring prevents heat conduction through the ring to the stone 2. The clay on the stone protects against direct flame impingement, convection and radiation and accordingly, the clay covers the stone 2 so as to be in the path of such heat transfer.

During the soldering operation, direct flames and radiation impinge on clay deposit 7 causing the outer surface of the clay to crust into a continuous film with a water curtain therebehind thereby fully protecting the stone 2. Heat conducted along the ring is absorbed by the bentonite before reaching stone 2. Accordingly, the stone 2, is fully protected during the soldering operation.

Referring to FIG. 2, the present invention is shown as applied to a orthodontic retainer 8 comprising a plastic palate 9 having retainer wire 10 extending therefrom. The retainer wire 10 has auxiliary springs 11 soldered at 12 so as to extend off the main base arch 13 of the wire 10 to accomplish minor tooth movements.

The retainer wires 10 in such retainers often break thereby requiring the wire to be soldered. In order to protect the plastic palate 9 and the adjacent solder joints 12 which might have a lower fusion temperature, water swollen bentonite clay is applied over the palate 9 as at 14 on and adjacent solder joint as at 15.

When heat is applied by gas torch 16, the plastic palate 9 is fully protected thereby preventing the same from melting. Damage to the adjacent solder joints 12 is also prevented by the bentonite at 15 absorbing the heat. While the bentonite does not cover all the adjacent solder joints 12, the deposit at 15 prevents heat conduction to these joints.

Referring to FIG. 3, a still further application of the present invention is illustrated wherein a welding torch 17 is shown forming a weld 18 between sheets 19 and 20. Water swollen bentonite paste applied at 21 prevents the spread of heat into the thin sheet 19 due to the water in the clay absorbing the heat conducted by sheet 19 thereby minimizing warping and distortion of the thin sheet beyond the paste area 21.

In the welding application illustrated in FIG. 3, the paste is applied across the entire lateral dimension of sheet 19 as shown in FIG. 4. In order to completely isolate the area beyond 21, the paste is cohesive enough so that it may be applied to the bottom surface as well. If the paste is applied only to a portion of the lateral dimension of the upper surface of sheet 19, substantially amounts of heat will still be absorbed thereby minimizing the amount of heat transferred beyond paste area 21 to some extent. Depending on the character of sheet 19, this may be sufficient to provide the desired protection and accordingly, in applications such as this, it may not be necessary to cover all heat conducting paths extending from the heated zone.

In other applications, it may be necessary to cover all heat-conducting paths extending from the heated zone. One such further application is to vary the temper of a selected portion of a piece of metal by heat treating a selected area of the metal while the clay is placed adjacent all sides of the selected area so as to cover all heat-conducting paths thereby preventing the heat treatment from affecting the temper of adjacent portions. Another use of the present invention in connection with heat treating is to vary the temper of one surface of a metal relative to its opposite surface by covering the opposite surface with bentonite while heating said one surface.

The bentonite used in carrying out the present invention comprises a clay mineral or mixture thereof with the predominant clay mineral constituent (at least 50 percent) being montmorillonite. This clay, a hydrous silicate of alumina, displays strong colloidal properties and, when in contact with water, expands several fold its original volume by swelling. Other clay minerals may be present such as illite, cristobalite and kaolinite as well as variable amounts of nonargillaceous detrital minerals.

Wyoming or western bentonite, which contains at least 85 percent montmorillonite and which carries sodium as the principle exchangeable ion, is the preferred bentonite for use in the present invention. This clay is in a finely divided form, 80 percent of its particles being less than 50 microns in size. A TYPICAL ANALYSIS of Wyoming variety bentonite as commercially available is as follows:

| | |
|---|---|
| $SiO_2$ (silicone dioxide) | 57.95 |
| $Fe_2O_3$ (hematite) | 2.89 |
| FeO (iron oxide) | 0.32 |
| MnO (manganese 0.09 | 0.09 |
| $Al_8O_3$ (aluminum oxide) | 19.93 |
| CaO (calcium 0.75 | .75 |
| MgO (magnesium oxide) | 2.49 |
| $K_2O$ (potassium oxide) | 0.33 |
| $Na_2O$ (sodium oxide) | 2.24 |
| $SO_3$ (sulphur trioxide) | 1.02 |
| $H_2O$ (water) at 110° C | 6.95 |

It is preferred that the Wyoming bentonite used be of a variety which is substantially grit free as obtained, e.g. by way of air float during pulverizing. The latter has an average particle size of less than 20 microns.

The property of the bentonite to increase in volume several fold on contact with water is very much increased by the addition of small amounts of magnesium oxide. The bentonite is preferably mixed with magnesium oxide in a weight proportion of 90 to 99.5. percent bentonite to 0.5 to 10 percent of MgO.

In producing a water swollen bentonite in accordance with the present invention, the bentonite may be finely pulverized and thereafter, if desired, mixed with manganese oxide. Water is then added slowly with constant mixing. The amount of water to bentonite can be varied so as to provide a desired consistency, viscosity and cohesiveness for a particular application. Generally, the water content will be in a range of 50—95 parts of water to 50—5 parts of bentonite, and preferably 80—90 parts of water to 20—10 of bentonite. When mixed in the latter proportions, the bentonite forms a homogeneous paste having the appearance and consistency of heavy grease and has sufficient cohesiveness to readily adhere to most surfaces.

The amount of bentonite applied to an area to be protected will depend on the intensity and duration of the heat application. As the bentonite absorbs the heat, the water is driven off. When the water is eliminated, no further heat is absorbed and the clay tends to crumble and fall off the surface being protected. Accordingly, sufficient amounts should be applied so that water is maintained in the clay during the entire heat application period.

A specific example of the present invention is as follows:

EXAMPLE I 16 parts by weight of bentonite clay (Wyoming grade bentonite)
84 parts by weight $H_2O$ The water was added slowly while constantly mixing with a conventional double-arm mixer. When all the water was mixed in, a paste was formed capable of flowing into crevices on irregular surfaces yet sufficiently viscous to self-sustain in its applied form.

The paste was applied to the mid portion of a 1 foot stainless steel wire, 0.045 inches in diameter, providing a ring of paste about the wire having a thickness of about one-quarter of an inch. The wire was gripped at one end while the other end was heated with a torch at 5,000° F. for 3 minutes. An identical wire, uncoated with the paste, was also heated in a similar fashion.

The uncoated wire could only be held for a period of 10 seconds due to the intense heat conducted to the gripped end. The wire containing the paste was gripped for the entire 3 minutes with only trace amounts of heat conducted to the gripped end.

EXAMPLE II

In a second experiment, the paste of example I was applied to paper in a thickness of one-eighth of an inch and the paper so coated was subjected to a direct point flame (5,200° F.) from a gas torch for 3 minutes. At the end of this period, the paper under the coating did not discolor or show any evidence of burn.

The foregoing is considered illustrative only of the principles of the invention. Since numerous modifications and changes will readily occur to those skilled in the art, it is not desired to limit the invention to the exact construction and operation shown and described, and accordingly all suitable modifications and equivalents may be resorted to as falls within the scope of the invention.

What I claim:

1. A process for applying heat to a selected area of a first member, said process including applying a water swollen bentonite paste to an area adjacent said selected area and then heating said selected area whereby heat transfer to areas beyond said selected area is minimized.

2. A process as defined by claim 1, wherein a second member is soldered to said first member in said selected area during said heating step.

3. A process as defined by claim 2, said second member being in part formed of material which melts when exposed to the heat of said heating step, said paste being applied so as to entirely cover portions of said material which are in the path of radiation, flame impingement and convection currents resulting from said heating step.

4. A process as defined by claim 2, said second member including a solder joint having a fusion temperature lower than the fusion temperature at which said first and said second members are soldered, said paste being applied to heat-conducting paths between said solder joint and junction of said first and second members.

5. A process as defined by claim 1, wherein a second member is welded to said first member in said selected area during said heating step.

6. A process as defined by claim 1, a second area on said member, applying said paste so as to cover heat conductive paths between said selected area and said second area, said heating being of an intensity and duration so as to vary the temper of said selected area.

7. A process as defined by claim 1, said paste being applied so as to entirely cover portions of said area adjacent said selected area which are in the path of radiation, flame impingement and convection currents resulting from said heating step.

8. A process as defined by claim 1, said paste is applied so as to cover a surface portion of said member opposite said selected area whereby the temper of said selected area is made to vary from the temper of said surface portion.

9. A process as defined by claim 1, said bentonite being of the Wyoming grade variety, being comprised of at least 50 percent by weight montmorillonite.

10. A process as defined by claim 9, said bentonite having a water content of at least 50 percent by weight.